Patented Oct. 11, 1932

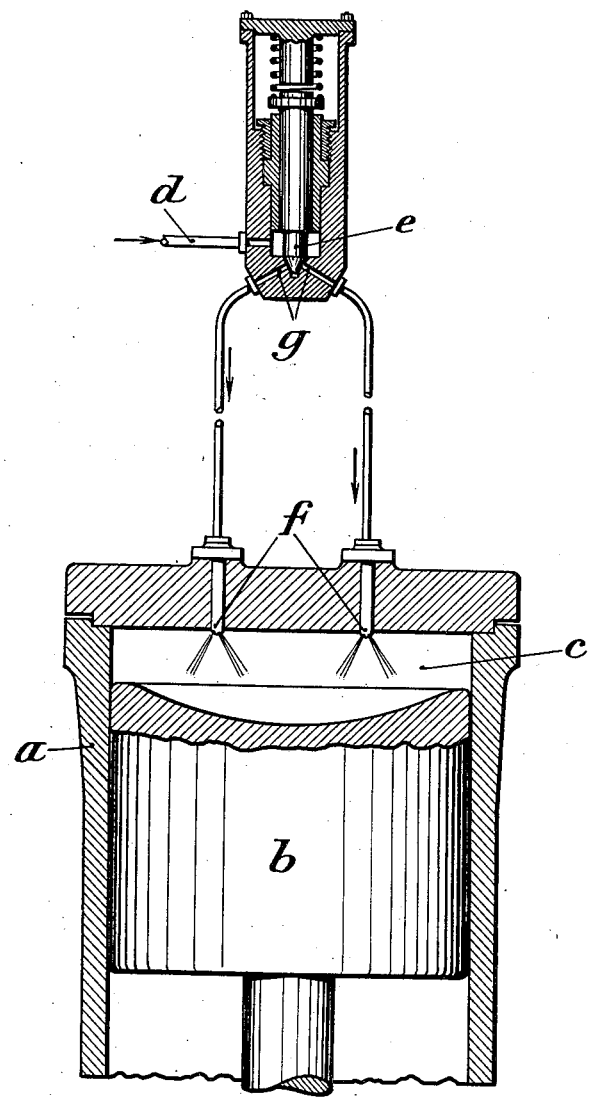

1,882,165

UNITED STATES PATENT OFFICE

OSCAR SIMMEN, OF ERLACH, SWITZERLAND, ASSIGNOR TO THE FIRM OF SULZER FRERES SOCIETE ANONYME, OF WINTERTHUR, SWITZERLAND

INTERNAL COMBUSTION ENGINE WITH SOLID FUEL INJECTION

Application filed March 27, 1931, Serial No. 525,763, and in Switzerland April 7, 1930.

This invention relates to internal combustion engines with solid fuel injection of the kind in which the fuel is injected into the combustion chamber through a plurality of injection nozzles.

In engines of this general type the nozzles are usually supplied with fuel through separate pipes permanently in open communication with a common fuel distributing chamber which in its turn is connected through a fuel delivery valve to one common delivery pipe of the fuel pump. Such an arrangement provides permanent direct communication between the separate supply pipes to the nozzles so that the columns of fuel in the supply pipes are liable to oscillate in a manner which tends to cause irregular distribution of the fuel to the nozzles, thereby impairing effective injection. The present invention has for its object to provide an improved construction whereby this disadvantage will be overcome.

To this end according to the present invention two or more separate fuel supply pipes for the injection nozzles lead from the seating of a single valve controlling the fuel distribution. Thus when the fuel valve is on its seating the fuel supply pipes are not in communication with each other and oscillation of the fuel columns in the pipes is prevented so that uniform distribution of the fuel to the various injection nozzles and therefore effective injection and combustion are ensured.

One construction according to the invention is illustrated by way of example in the accompanying drawing in which a plurality of uniformly distributed injection nozzles $f$ open into the combustion chamber $c$ of a cylinder $a$ within which a piston $b$ reciprocates. The nozzles $f$ are supplied with fuel through separate pipes each of which communicates through a separate passage $g$ with the seating of a distributing valve $e$. Fuel is supplied by a pump (not shown) to the distributing valve through a pipe $d$ so that when injection is to take place the distributing valve $e$ is opened by pressure of the fuel itself.

It will be readily seen therefore that with a construction embodying the present invention communication between the individual pipes which supply fuel to the injection nozzles and therefore oscillation of the columns of fuel within the pipes are prevented.

I claim:

A device for supplying solid fuel to an internal combustion engine comprising a plurality of nozzles for simultaneously injecting the fuel into the engine, a supply pipe for each nozzle, a main fuel supply pipe, a valve connecting said main fuel supply pipe to the supply pipes of the nozzles, said valve normally tending to close and separate each supply pipe from every other one and from the main fuel supply pipe, and opening only under the influence of pressure from the main fuel supply pipe.

In testimony whereof I have affixed my signature.

OSCAR SIMMEN.